(12) United States Patent
Ikemoto et al.

(10) Patent No.: US 7,059,354 B2
(45) Date of Patent: Jun. 13, 2006

(54) REFRIGERANT TRANSPORTATION HOSE

(75) Inventors: Ayumu Ikemoto, Komaki (JP); Tetsuya Arima, Kasugai (JP)

(73) Assignee: Tokai Rubber Industries, Ltd., Aichi-Ken (JP)

( * ) Notice: Subject to any disclaimer, the term of this patent is extended or adjusted under 35 U.S.C. 154(b) by 0 days.

(21) Appl. No.: 11/180,785

(22) Filed: Jul. 14, 2005

(65) Prior Publication Data

US 2006/0011250 A1 Jan. 19, 2006

(30) Foreign Application Priority Data

Jul. 15, 2004 (JP) .............................. 2004-208867

(51) Int. Cl.
*F16L 11/00* (2006.01)

(52) U.S. Cl. ...................... 138/126; 138/124; 138/140; 138/137; 428/36.9

(58) Field of Classification Search ................ 138/126, 138/123, 124; 428/36.8, 36.9
See application file for complete search history.

(56) References Cited

U.S. PATENT DOCUMENTS

| | | | | |
|---|---|---|---|---|
| 4,497,856 A | * | 2/1985 | Iwasawa et al. | 220/62.11 |
| 4,534,926 A | * | 8/1985 | Harriett | 264/281 |
| 4,593,062 A | * | 6/1986 | Puydak et al. | 524/426 |
| 4,687,794 A | * | 8/1987 | Huddleston et al. | 523/351 |
| 5,049,610 A | * | 9/1991 | Takaki et al. | 152/209.4 |

FOREIGN PATENT DOCUMENTS

JP 7-68659 3/1995

* cited by examiner

*Primary Examiner*—Patrick Brinson
(74) *Attorney, Agent, or Firm*—Westerman, Hattori, Daniels & Adrian, LLP.

(57) ABSTRACT

A refrigerant transportation hose having excellent processability and durability, as well as high resistance to gas permeation (gas barrier properties) and adequate flexibility. The refrigerant transportation hose containing a tubular rubber layer in which refrigerant is circulated, the tubular rubber layer is formed by a material consisting essentially of components (A) to (C):

(A) at least one rubber of butyl rubber and halogenated butyl rubber;

(B) polybutene; and (C) a white filler.

8 Claims, 1 Drawing Sheet

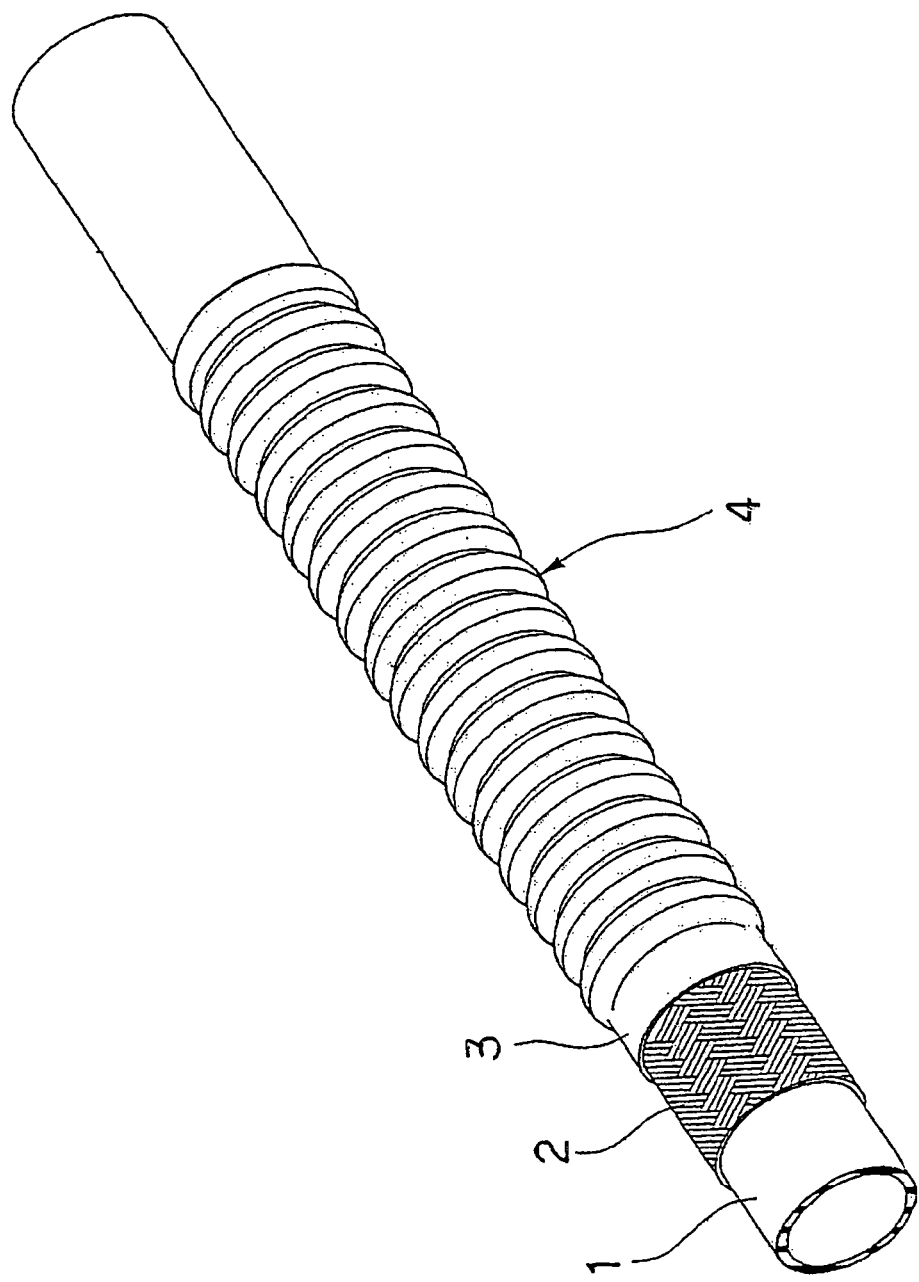
Figure

REFRIGERANT TRANSPORTATION HOSE

BACKGROUND OF THE INVENTION

1. Field of the Invention

The present invention relates to a refrigerant transportation hose (an air-conditioner hose) and specifically to a refrigerant transportation hose that is mounted in an engine compartment of an automobile.

2. Description of the Related Art

Generally, a rubber hose is used for a refrigerant transportation hose that is mounted in an engine compartment of an automobile in terms of assembly, a vibration transmission property, flexibility and the like. For example, proposed is a hose having a structure of a tubular inner rubber layer in which refrigerant is circulated, a reinforcing layer formed on an outer peripheral surface of the tubular inner rubber layer and an outer rubber layer formed on an outer peripheral surface of the reinforcing layer (for example, see Japanese Unexamined Patent Publication No. 07-068659).

Since such a refrigerant transportation hose requires resistance to gas permeation (gas barrier properties) for blocking or reducing gas permeation (permeation of refrigerant such as Freon gas (trade name) available from Du Pont de Nemours and Company) from the inside of the hose to the outside, butyl rubber excellent in gas barrier properties is used for such an inner rubber layer.

Recently, to further improve gas barrier properties, some trials has been conducted. For example, a white filler (talc) to be blended in the butyl rubber is increased or a plasticizer (oil) to be blendend therein is decreased.

However, since the increasing amount of a white filler (talc) or the decreasing amount of a plasticizer (oil) increases hardness of the inner rubber layer, the resulting hose is inferior in flexibility. Further, since viscosity of the material increases when manufacturing a hose, rubber scorching may occur due to increasing pressure of an extruder head and fluidity of rubber may deteriorate, resulting in a problem of inferior moldability. Further, since the hose itself becomes brittle, there are other problems such as deterioration of fatigue properties such as a bending fatigue property and a dumbbell fatigue property.

SUMMARY OF THE INVENTION

In view of such circumstances, it is an object of the present invention to provide a refrigerant transportation hose having excellent processability and durability, as well as high resistance to gas permeation (gas barrier properties) and adequate flexibility.

To this end, the present invention is a refrigerant transportation hose containing a tubular rubber layer in which refrigerant is circulated, the tubular rubber layer is formed by a material consisting essentially of components (A) to (C):

(A) at least one rubber of butyl rubber and halogenated butyl rubber;
(B) polybutene; and
(C) a white filler.

The present inventors intensively studied oil and polymers to obtain a refrigerant transportation hose having improved resistance to gas permeation (gas barrier properties) and improved flexibility without deteriorating processability and durability. As a result, the present inventors found that when polybutene of a liquid polymer is blended in at least one rubber of butyl rubber and halogenated butyl rubber, compatibility between the polybutene and the rubber is good and resistance to gas permeation (gas barrier properties) and flexibility are improved, and thereby accomplished the present invention. It is thought that since the polybutene is mainly composed of isobutylene ($-C(CH_3)_2CH_2-$), gas permeation is blocked due to steric hindrance structure of many methyl groups present in its molecular structure, so that resistance to gas permeation (gas barrier properties) is improved, while since the polybutene is a liquid polymer and thus provides a plasticizing effect, the hardness of the hose lowers so that flexibility improves. According to the present invention, since the use of polybutene improves resistance to gas permeation (gas barrier properties) and flexibility as described above, it is not necessary to increase a white filler (talc) or decrease a plasticizer (oil), so that processability and durability are not deteriorated.

In the refrigerant transportation hose of the present invention, the tubular rubber layer in which refrigerant is circulated is formed by a material prepared by blending polybutene (component (B)) and a white filler (component (C)) in at least one rubber of butyl rubber and halogenated butyl rubber (component (A)). For this reason, resistance to gas permeation (gas barrier properties) is improved due to steric hindrance structure of methyl groups present in the molecular structure of the polybutene (component (B)), while the hardness of the hose lowers so that flexibility improves by blending the polybutene (component (B)). Therefore, it is not necessary to increase a white filler (component (C)) or decrease a plasticizer (oil), so that processability and durability are not deteriorated.

In particular, when the polybutene (component (B)) is present at 3 parts by weight or more relative to 100 parts by weight of the specific rubber (component (A)), the above-mentioned effects can be obtained and also processability is further improved.

The refrigerant transportation hose according to the present invention is used as a refrigerant transportation hose (an air-conditioner hose) that is mounted in an engine compartment of an automobile.

BRIEF DESCRIPTION OF THE DRAWING

The sole FIGURE of the drawing is a block diagram illustrating one embodiment of a refrigerant transportation hose according to the present invention.

DESCRIPTION OF THE PREFERRED EMBODIMENTS

Embodiments of the present invention will be described in detail below.

A refrigerant transportation hose of the present invention may have a structure, for example, as shown in the FIGURE, by forming a reinforcing layer 2 on an outer peripheral surface of an inner rubber layer 1 and further forming an outer layer 3 on an outer peripheral surface of the reinforcing layer 2. The center portion of the refrigerant transportation hose is formed into a corrugated portion 4 in terms of vibration absorbability.

The main feature of the present invention is that the inner rubber layer 1 having a tubular shape in which refrigerant is circulated is formed by a material consisting essentially of components (A) to (C):

(A) at least one rubber of butyl rubber and halogenated butyl rubber;
(B) polybutene; and
(C) a white filler.

In the present invention, "consisting essentially of" means "containing necessarily in terms of composition", as contrasted with "optional components", and no quantitative restriction is imposed thereby.

Examples of the specific rubber (component (A)) for forming the inner rubber layer include butyl rubber (IIR) and halogenated butyl rubber. These are used either alone or in combination. Examples of the halogenated butyl rubber include chlorinated butyl rubber (Cl—IIR) and brominated butyl rubber (Br—IIR).

When blending the butyl rubber and the halogenated butyl rubber herein, the weight ratio is preferably the butyl rubber/the halogenated butyl rubber=10/90 to 90/10.

The polybutene (component (B) used in combination with the specific rubber (component (A)) is not particularly limited as long as the polybutene is a liquid polymer mainly composed of isobutylene (—$C(CH_3)_2CH_2$—) as described above.

The number average molecular weight (Mn) of the polybutene (component (B)) is preferably 300 to 3,700, particularly preferably 500 to 3,000. The kinematic viscosity (at 100° C.) of the polybutene (component (B)) is preferably 2 to 5,700 $mm^2/s$, particularly preferably 10 to 4,000 $mm^2/s$. Examples of the polybutene (component (B)) include polybutene HV-1900 available from NIPPON PETROCHEMICALS COMPANY, LIMITED of Tokyo, Japan.

The amount of the polybutene (component (B)) is preferably not less than 3 parts by weight (hereinafter, just abbreviated to "parts"), particularly preferably 5 to 15 parts relative to 100 parts of the specific rubber (component (A)). When the amount of the polybutene (component (B)) is less than 3 parts, an effect for improving resistance to gas permeation (gas barrier properties) is low.

The white filler (component (C)) used in combination with the specific rubber (component (A)) and the polybutene (component (B)) is not specifically limited, however, examples thereof include talc, mica, sericite, montmorillonite, silica and clay. These are used either alone or in combination.

The amount of the white filler (component (C)) is preferably 50 to 200 parts, particularly preferably 70 to 180 parts relative to 100 parts of the specific rubber (component (A)). When the amount of the white filler (component (C)) is less than 50 parts, resistance to gas permeation (gas barrier properties) tends to deteriorate. When the amount of the white filler (component (C)) exceeds 200 parts, the hardness increases, so that flexibility and vibration absorbability of the resulting hose are inferior and extrusion processability tends to deteriorate.

The material for forming the inner rubber layer may contain a vulcanizing agent, carbon black, a plasticizer and the like, as required, in addition to the specific rubber (component (A)), the polybutene (component (B)), and the white filler (component (C)).

Examples of the vulcanizing agent include sulfur and resin vulcanizing agents such as an alkylphenol-formaldehyde resin. These are used either alone or in combination.

The amount of the vulcanizing agent is preferably 5 to 20 parts, particularly preferably 7 to 12 parts relative to 100 parts of the specific rubber (component (A)).

The amount of the carbon black may be adjusted depending on the required tensile property or the required hardness, however, is preferably 20 to 150 parts, particularly preferably 40 to 100 parts relative to 100 parts of the specific rubber (component (A)).

Examples of the plasticizer include aromatic oil, naphthene oil and paraffin oil. These are used either alone or in combination.

The amount of the plasticizer is preferably not more than 10 parts, particularly preferably not more than 5 parts relative to 100 parts of the specific rubber (component (A)).

The reinforcing layer 2 formed on an outer peripheral surface of the inner rubber layer 1 may be formed, for example, by spiralling, knitting and braiding reinforcing fibers such as a polyethylene terephthalate (PET) fiber, a polyethylene naphthalate (PEN) fiber, an aramid fiber, a polyamide (nylon) fiber, a vinylon (polyvinyl alcohol) fiber, a rayon fiber and a metallic wire.

The material for forming the outer layer 3 on an outer peripheral surface of the reinforcing layer 2 is not specifically limited, however, examples thereof include a material prepared by appropriately blending a vulcanizing agent and/or carbon black in a rubber material such as butyl rubber (IIR), halogenated butyl rubbers such as chlorinated butyl rubber (Cl—IIR) and brominated butyl rubber (Br—IIR), acrylonitrile-butadiene copolymer rubber (NBR), chloroprene rubber (CR), ethylene-propylene-diene rubber (EPDM), ethylene-propylene rubber (EPM), fluorocarbon rubber (FKM), epichlorohydrin rubber (ECO), acrylic rubber, silicone rubber, chlorinated polyethylene rubber (CPE) and urethane rubber. Further, thermoplastic elastomers (TPE), such as an acrylic elastomer, a styrene elastomer, an olefin elastomer, a diolefin elastomer, a vinyl chloride elastomer, a urethane elastomer, an ester elastomer, an amide elastomer, a fluorine elastomer and a silicone elastomer, heat-shrinkable tubing or the like may be used.

The refrigerant transportation hose of the present invention, as shown in the FIGURE, may be manufactured in the following manner. First, the specific rubber (component (A)), the polybutene (component (B)), and the white filler (component (C)), and, if necessary, other materials, such as the vulcanizing agent, are blended in a specific ratio, and then are kneaded by a Banbury mixer or the like to prepare a material for forming the inner rubber layer 1. The material for forming the inner rubber layer 1 is molded by means of injection or the like for forming the inner rubber layer 1 having a corrugated portion 4 in the center thereof. Next, a mandrel, such as resin mandrel, is prepared, and is inserted in the inner rubber layer 1 prepared by the above-mentioned manner. Then, a reinforcing layer 2 is formed by braiding a reinforcing fiber onto an outer peripheral surface of the inner rubber layer 1. Further, a dipping liquid is prepared as a material for forming the outer layer 3. The laminated hose body comprising the inner rubber layer 1 and the reinforcing layer 2 is continuously dipped in the dipping liquid. The thus prepared laminated hose body is put into a drying oven for drying and thus the laminated hose body of the outer layer 3 formed on an outer peripheral surface of the reinforcing layer 2 is produced. Finally, the refrigerant transportation hose, as shown in the FIGURE, having the reinforcing layer 2 formed on an outer peripheral surface of the inner rubber layer 1, the outer layer 3 formed on an outer peripheral surface of the reinforcing layer 2, and the corrugated portion 4 in the center thereof, is produced by removing the mandrel from the laminated hose body.

The manner for producing the refrigerant transportation hose of the present invention is not limited to the above-mentioned manner. For example, the reinforcing layer 2 may be formed by directly braiding a reinforcing fiber onto a surface of the inner rubber layer 1 without the use of a mandrel. Further, the outer layer 3 may be formed by extrusion.

In the refrigerant transportation hose of the present invention, an inner diameter is preferably 5 to 50 mm, particularly preferably 6 to 33 mm, a thickness of the inner rubber layer 1 is preferably 0.05 to 1 mm, particularly preferably 0.1 to 0.6 mm, and a thickness of the outer layer 3 is preferably 0.5 to 5 mm, particularly preferably 1 to 4 mm.

The structure of the refrigerant transportation hose of the present invention is not limited to the three-layer structure, as shown in the FIGURE, as long as the refrigerant transportation hose is provided with at least a tubular inner rubber layer 1 in which refrigerant is circulated. For example, an intermediate layer (rubber layer) may be formed between an inner rubber layer 1 and a reinforcing layer 2, or between an reinforcing layer 2 and an outer layer 3.

Examples of the present invention will be described below in conjunction with Comparative Example.

The following materials were prepared for the Examples and Comparative Example.

Chlorinated Butyl Rubber (Cl—IIR)
  Butyl HT1066 available from JSR Corporation of Tokyo, Japan Butyl Rubber (IIR)
  Butyl 365 available from JSR Corporation of Tokyo, Japan Stearic Acid
  LUNAC S-30 available from Kao Corporation of Tokyo, Japan Carbon Black
  SEAST 116 available from TOKAI CARBON CO., LTD. of Tokyo, Japan White Filler (Talc)
  MICRO ACE K-1 available from NIPPON TALC CO., LTD. of Osaka, Japan Naphthene Oil
  Diana Process NM-300 available from Idemitsu Kosan Co., Ltd. of Tokyo, Japan Liquid Polybutene
  Polybutene HV-1900 (Mn: 2,900, kinematic viscosity at 100° C.: 590 mm$^2$/s) available from NIPPON PETROCHEMICALS COMPANY, LIMITED of Tokyo, Japan Zinc Oxide
  Two kinds of zinc oxide available from Mitsui Mining & Smelting Co., Ltd. of Tokyo, Japan Resin Vulcanizing Agent
  Alkylphenol-formaldehyde resin (TACKROL 201 available from TAOKA CHEMICAL CO., LTD. of Osaka, Japan)

EXAMPLE 1

Preparation of Material for Forming Inner Rubber Layer
  A material was prepared by blending the ingredients in a blend ratio as shown in Table 1 and kneading the resulting mixture by means of a Banbury mixer.

Production of Hoses
  An inner rubber layer having a corrugated portion in the center thereof was produced by injection molding the material in a specified mold. Next, a resin mandrel was prepared and was inserted in the inner rubber layer prepared in the above-mentioned manner. In turn, a reinforcing fiber (PET fiber) was bladed on an outer peripheral surface of the inner rubber layer for forming a reinforcing layer. Then, the laminated hose body comprising the inner rubber layer and the reinforcing layer was continuously dipped in a dipping liquid (NBR solution) for forming an outer layer. The thus prepared laminated hose body was put into a drying oven for drying and thus the laminated hose body of the outer layer formed on an outer peripheral surface of the reinforcing layer was produced. Finally, the refrigerant transportation hose, as shown in the FIGURE, having a corrugated portion in the center thereof, was produced by removing the mandrel from the laminated hose body and cutting off the thus produced product of continuous length.

EXAMPLES 2 TO 6 AND COMPARATIVE EXAMPLE

Inner rubber layer materials were prepared in the same manner as in EXAMPLE 1 except that ingredients or the blend ratios of the ingredients were changed as shown in Table 1. Refrigerant transportation hoses were produced in the same manner as in EXAMPLE 1 except that the thus prepared materials were used.

Properties of the hoses produced in accordance with the EXAMPLES and the COMPARATIVE EXAMPLE were evaluated in the following manners. The results of the evaluations are also shown in Table 1.

Physical Property Before Vulcanizing (Mooney Viscosity)
  The Mooney viscosity of a material for forming each inner rubber layer was measured at 121° C.

Initial Property
  A rubber sheet having a thickness of 2 mm was produced by press vulcanizing a material for forming each inner rubber layer at 150° C. for 45 minutes. Tensile strength at break (TB), elongation at break (EB) and hardness (durometer Type A) of each rubber sheet were measured in accordance with Japanese Industrial Standards (JIS) K 6251.

Gas Barrier Properties
  A rubber sheet was produced in the same manner as mentioned in the above "Initial property". Gas permeation properties were evaluated by using the thus prepared rubber sheet. First, an opening of a cup in which Freon gas (HFC-134a) was filled at a low temperature (−35° C. or below) was closed by a vulcanized rubber sheet. Then, the cup closed in such a manner was allowed to stand in an oven at 90° C. The weight change (weight loss) of Freon gas per day relative to a permeation area was obtained as a permeation amount of Freon gas. Each permeation amount was indicated by a relative index as regarded the permeation amount of COMPARATIVE EXAMPLE as a standard value (100). The relative index lower than 100 means that gas barrier properties were good.

Moldability
  Fluidity of the inner rubber layer material was evaluated when injection molding each inner rubber layer material into a specified mold. In the case where the material was molded to the total length was evaluated as good (○), while in the case where the material was not molded to the total length was evaluated as fair (Δ).

Fatigue Properties
  Each inner rubber layer material was press vulcanized at 150□C for 45 minutes for producing a rubber sheet having a thickness of 2 mm. Then, a JIS No. 5 dumbbell specimen was punched out. The number of time for rupture was measured at conditions of room temperature, a distortion amount of 0 to 100% and a frequency of 5 Hz. The number of not less than 200,000 times was evaluated as good (○), the number of not less than 100,000 and less than 200,000 times was evaluated as fair (Δ), and the number of less than 100,000 times was evaluated as poor (X).

TABLE 1

| | (parts by weight) | | | | | | |
|---|---|---|---|---|---|---|---|
| | EXAMPLE | | | | | | COMPARATIVE |
| | 1 | 2 | 3 | 4 | 5 | 6 | EXAMPLE |
| Inner rubber layer material | | | | | | | |
| Cl-IIR | 75 | 75 | 75 | 75 | 75 | 75 | 75 |
| IIR | 25 | 25 | 25 | 25 | 25 | 25 | 25 |
| Stearic acid | 1 | 1 | 1 | 1 | 1 | 1 | 1 |
| Carbon black | 40 | 40 | 40 | 40 | 40 | 40 | 40 |
| Talc | 110 | 110 | 110 | 110 | 100 | 110 | 110 |
| Naphthene oil | — | — | — | — | — | — | 3 |
| Liquid polybutene | 3 | 5 | 10 | 15 | 3 | 20 | — |
| Zinc oxide | 5 | 5 | 5 | 5 | 5 | 5 | 5 |
| Resin vulcanizing agent | 9 | 9 | 9 | 9 | 9 | 9 | 9 |
| Physical property before vulcanizing (Mooney viscosity) | 42 | 40 | 36 | 32 | 40 | 30 | 43 |
| Initial property | | | | | | | |
| TB (MPa) | 9.4 | 9.5 | 9.0 | 8.1 | 9.6 | 7.5 | 9.4 |
| EB (%) | 330 | 340 | 360 | 390 | 320 | 410 | 310 |
| Hardness (HA) | 79 | 78 | 76 | 73 | 78 | 70 | 80 |
| Gas barrier properties (Relative index) | 97 | 90 | 95 | 100 | 100 | 105 | 107 |
| Moldability | Δ | ○ | ○ | ○ | ○ | ○ | Δ |
| Fatigue properties | ○ | ○ | ○ | ○ | ○ | ○ | Δ |

The results demonstrated that the hoses of the EXAMPLES had excellent gas barrier properties, excellent flexibility, excellent processability and excellent fatigue properties because the hoses of EXAMPLES used liquid polybutene. Further, the hose according to EXAMPLE 5, in which the use amount of talc was decreased by about 10% as compared with EXAMPLE 1, had a low Mooney viscosity and thus had improved moldability.

On the other hand, the hose according to COMPARATIVE EXAMPLE, in which naphthene oil was used instead of the liquid polybutene, had deteriorated gas barrier properties and a slightly higher Mooney viscosity.

What is claimed is:

1. A refrigerant transportation hose containing a tubular rubber layer in which refrigerant is circulated, the tubular rubber layer is formed by a material consisting essentially of components (A) to (C):
   (A) at least one rubber of butyl rubber and halogenated butyl rubber;
   (B) liquid polybutene; and
   (C) a white filler.

2. A refrigerant transportation hose according to claim 1, wherein the component (B) is present at 3 parts by weight or more relative to 100 parts by weight of the component (A).

3. A refrigerant transportation hose according to claim 1, wherein the number average molecular weight (Mn) of the component (B) is 300 to 3,700.

4. A refrigerant transportation hose according to claim 2, wherein the number average molecular weight (Mn) of the component (B) is 300 to 3,700.

5. A refrigerant transportation hose containing a tubular rubber layer in which refrigerant is circulated, a reinforcing layer formed on an outer peripheral surface of the tubular rubber layer, and, an outer layer formed on an outer peripheral surface of the reinforcing layer, the tubular rubber layer is formed by a material consisting essentially of components (A) to (C):
   (A) at least one rubber of butyl rubber and halogenated butyl rubber;
   (B) liquid polybutene; and
   (C) a white filler.

6. A refrigerant transportation hose according to claim 5, wherein the component (B) is present at 3 parts by weight or more relative to 100 parts by weight of the component (A).

7. A refrigerant transportation hose according to claim 5, wherein the number average molecular weight (Mn) of the component (B) is 300 to 3,700.

8. A refrigerant transportation hose according to claim 6, wherein the number average molecular weight (Mn) of the component (B) is 300 to 3,700.

* * * * *